United States Patent
Andress et al.

(10) Patent No.: US 11,178,846 B2
(45) Date of Patent: Nov. 23, 2021

(54) ENVIRONMENTAL CONTROL APPARATUS FOR ANIMAL HOUSING FACILITIES

(71) Applicant: Enviro-Max, Inc., Indianapolis, IN (US)

(72) Inventors: David Andress, Indianapolis, IN (US); Mikel Robinson, Indianapolis, IN (US); Matthew D. Andress, Indianapolis, IN (US); Thomas R. Ryan, Indianapolis, IN (US); Brian L. Whitesell, Zionsville, IN (US); Brian Rueschhoff, Fishers, IN (US)

( * ) Notice: Subject to any disclaimer, the term of this patent is extended or adjusted under 35 U.S.C. 154(b) by 235 days.

(21) Appl. No.: 16/041,794

(22) Filed: Jul. 22, 2018

(65) Prior Publication Data
US 2019/0133070 A1    May 9, 2019

Related U.S. Application Data

(60) Provisional application No. 62/535,303, filed on Jul. 21, 2017.

(51) Int. Cl.
*A01K 31/00* (2006.01)
*A01K 31/20* (2006.01)
*A01K 1/00* (2006.01)
*B01D 46/44* (2006.01)

(52) U.S. Cl.
CPC ............ *A01K 1/0047* (2013.01); *A01K 31/00* (2013.01); *A01K 31/20* (2013.01); *B01D 46/448* (2013.01); *B01D 2279/35* (2013.01)

(58) Field of Classification Search
CPC .................. B01D 46/448; B01D 2279/35; A01K 1/0047; A01K 31/00; A01K 31/20

USPC ........ 55/385.2; 454/187, 363; 119/303, 306, 119/314, 448; 237/3, 6, 14, 8 R
See application file for complete search history.

(56) References Cited

U.S. PATENT DOCUMENTS

| | | | | | |
|---|---|---|---|---|---|
| 2,983,213 | A | * | 5/1961 | Bohanon | F24F 11/74 454/228 |
| 4,171,770 | A | * | 10/1979 | Mailander, Sr. | A01K 31/20 119/303 |
| 4,281,789 | A | * | 8/1981 | Quinlisk | F24F 11/30 236/44 C |
| 5,107,792 | A | * | 4/1992 | Bugl | A01K 1/0041 119/448 |
| 6,481,380 | B1 | * | 11/2002 | Barnett, Sr. | A01K 1/0047 119/417 |
| 2015/0075373 | A1 | * | 3/2015 | Miller | B01D 46/0087 95/15 |

* cited by examiner

*Primary Examiner* — Minh Chau Pham
(74) *Attorney, Agent, or Firm* — Indiano Law Group, LLC; John T. Woods, III; E. Victor Indiano

(57) ABSTRACT

The present application is directed to an environmental control system for an agricultural animal housing facility. This system includes a plurality of air handling systems configured to deliver supply air to an agricultural animal housing facility, wherein each air handling system is configured to receive a portion of fresh air and a portion of recirculated internal air, and wherein each air handling system is configured to mix the fresh air and internal air and provide the resultant mixture to the agricultural animal housing facility as supply air. The plurality of air handling systems are configured to regulate a proportion of fresh air to internal air in response to an internal temperature of the agricultural animal housing facility.

20 Claims, 7 Drawing Sheets

ENVIRONMENTAL CONTROL APPARATUS FOR ANIMAL HOUSING FACILITIES

CROSS REFERENCE TO RELATED APPLICATIONS

The present application claims the benefit of U.S. Provisional Application No. 62/535,303 filed Jul. 21, 2017, the entire contents of which are incorporated herein by reference.

TECHNICAL FIELD OF THE INVENTION

The present application relates to an environmental system apparatus, and in particular to an environmental control apparatus that is especially useful in connection with agricultural buildings.

BACKGROUND

Modern agriculture relies on raising livestock and poultry in buildings, rather than allowing live stock to freely graze in fields. This confined raising of livestock is particularly prevalent in the raising of hogs as well as poultry such as chickens, turkeys, geese, and the like. One such agricultural building is a poultry laying house. A poultry laying house is a building that is designed to hold a large number of hens and is designed to feed the hens, grow the hens, and shelter the hens while they lay eggs. The agricultural output from such a poultry laying house is typically the eggs laid by the hens.

A typical poultry laying house is formed to have a generally rectangular foot print. The rectangular foot print includes two short sides and two very long sides. The two opposed short sides will be referred to herein as the upstream side and the downstream side. The two long sides will be referred to as the long sides of the houses. Although poultry laying houses include various dimensions, foot print shape, and number of levels, an exemplary poultry laying house can have a width of approximately 100 feet, a length of approximately 500 feet, and a height of approximately 13 feet. This 100 foot by 500 foot poultry laying house could accommodate up to 200,000 birds.

The large number of fowl in this confined space results in some significant environmental issues. The first environmental issue is the generation of heat. As will be appreciated, the warm bodies of 200,000 birds generates a significant amount of sensible and latent heat. In fact, the amount of heat generated by the birds during the winter months is sufficient to keep the building warm without the addition of supplemental heat.

Another environmental issue within such buildings is the build-up of animal waste. Typically, most agricultural buildings place the structures which the hens reside (e.g. cages, floors, or the like) on a raised platform having slats or holes therein. Underneath the slatted floor is an excrement collection area. The waste can be manually removed or an excrement collection system can be utilized to collect the waste. Such an excrement collection system can comprise a belted system that runs belts under the slatted floor to carry the manure from the position under the floor to the end of the unit or can comprise a scraper system which scrapes the excrement to the end of the unit. An excrement holding area is frequently located adjacent to the downstream end of the facility. The manure generation has other environmental impacts that impact the birds. In particular, the excrement is rich in ammonia which can create a toxic environment for the birds. A high ammonia concentration can also seriously affect the people working in the environment.

Due to the build-up of sensible and latent heat, ammonia, carbon dioxide and other toxins from the excrement, it is desirable to have an air exchange system within a poultry laying barn that introduces a large amount of fresh air sufficient to reduce the heat and also to dilute the moisture and obnoxious gases, such as ammonia and the like. During the summer months, greater than thirty air changes per hour may occur to reduce the build-up of heat. As is readily apparent, the large volume of airflow needed to reduce heat during the summer months can be effective in removing and/or diluting the concentration of ammonia in the poultry laying house. However, in the winter there are less air changes per hour due to the fact that one would not wish to introduce significant amounts of cold, sub-freezing air into the poultry as it can hamper their egg laying efficacy and, in extreme cases, can physically harm the birds. Nonetheless, there is a significant amount of outside air required to be introduced through the building to counteract the effects of the sensible heat, latent heat, ammonia, carbon dioxide and other toxins to provide a generally healthy even temperature atmosphere throughout the building.

Typical poultry laying houses include a plurality of propeller type fans which are effective to flow ambient outdoor air into the building at an upstream end, flow this air through a length of the building, and exhaust the heated air from a downstream end. This type of ventilation system is referred to as "tunnel ventilation". The propeller type fan is capable of moving large amounts of air, however the fan performance is greatly reduced by small increases in static pressure. Poultry laying houses of the prior art commonly operate on a negative pressure system. This negative pressure is created by a plurality of exhaust fans in a downstream wall pulling ambient air from the upstream end. A plurality of baffles are commonly utilized to restrict the airflow through the upstream end, and can be utilized to restrict the airflow through the downstream end, thereby trying to ensure a sufficient pressure differential between the upstream and downstream ends to flow a desired amount of air through the building. This pressure differential tries to ensure that fresh air flows through the length of the building and is not isolated to a particular end. Another benefit to this pressure differential, in theory, is to reduce areas of stagnation within the building.

It has been discovered that when outdoor temperatures fall below 50 degrees F., these tunnel ventilation systems have a large temperature differential between the intake end and the exhaust end of the building. In many instances, this temperature differential can exceed 30 degrees between the ends of the building [e.g. 50 degrees F. entering and 80 degrees F. leaving]. This temperature differential is caused by the reduction of air speed within the house. The amount of outdoor air is reduced in order to prevent "freezing" the birds that are located at the intake end of the house.

In prior art poultry laying houses there is significant temperature variability within the house in addition to air quality variability between the ends of the building. For example, there may be scattered "good spots" where there is adequate airflow, humidity, temperature characteristics, and other "bad spots" where there might be high humidity and otherwise unfavorable conditions. It is not possible within the prior art poultry laying houses to keep constant conditions throughout the house, or to optimize the temperatures at all positions within the house.

In prior art houses environmental control generally occurs in two ways. One way is to control the temperature, and the other is to control the air flow. The temperature is controlled by the decision of whether or not to turn a fan on, primarily. The air flow is controlled by determining how large to open the intake baffles that are disposed adjacent to the upstream fan members. In order to determine air flow, a static pressure sensor is provided in the house that measures pressure. This pressure is measured and compared against the pressure of the second static pressure sensor that is disposed exteriorly of the building. Depending upon the differential in static pressure, one might have either a large amount of air flow, or a small amount of air flow. If there is a low temperature differential, it is likely that there is very little air flow. In cases where there is little air flow, a way to rectify the situation is to close the baffles to create a smaller intake which enables the air flowing through the system to flow more quickly to get greater air flow.

On the other hand, if there is an unfavorable, increased pressure differential between the interior of the house and the exterior, the remedy is to usually open the baffles to thereby slow down the air flow through house. Another side effect that can occur if there is too much air flow is that the birds can get a heavier coat of feathers. Generally, heavier coats of feathers are not appreciated by owners. Extra feathers are not appreciated because it leads to a variety of conditions that have both health consequences to the birds and economic consequences to the bird owners. For example, an increase in feathers typically results in an increase in shell thickness and unnecessary feed intake as well as a decrease in egg production.

In some agricultural buildings, both the upstream and downstream walls include a plurality of fans. The fans in the upstream wall (the intake fans) are provided to suck air from the outside environment and blow them into the upstream end of the building. The fans at the downstream air (exhaust fans) are provided to withdraw air from the interior of the building, create the desired pressure differential, and push the air, as well as the heat and toxins contained therein, outside.

Although prior art laying houses perform their function in a workmanlike manner, significant room for improvement exists. Applicants have found that optimal hen growth, as well as egg production, occurs within a specific temperature range. To the extent that one can keep the temperature within a fixed desirable range, one can promote optimum egg production, reduce mortality, and create an overall healthy environment for both the birds and employees within the house.

Furthermore, the ability to control and maintain the temperature of the entire poultry laying house can be utilized to optimize hen growth and egg production. For example, many egg producers tend to keep an area in which younger birds are placed at a colder temperature than the temperature which older birds are placed. By keeping the younger birds at a colder temperature, the younger birds consume more food and growth is thereby promoted to control egg size. However, it is desirable to keep older egg producing birds lean. In order to promote the proper weight range of the older chickens it may be desirable to keep the temperature for the older birds warmer such that they eat less food. As will be readily appreciated, the temperature gradient inherently present within prior art laying houses of 30 degrees does not lend itself to bird growth control and/or optimized egg production conditions throughout an entirety of the laying house.

Another problem with prior art laying houses relates to formation of undesirable humidity levels within the buildings. It will be appreciated that the air exhaled by poultry or any other living animals contains a high amount of moisture. When this moisture strikes a cold surface, such as a surface of an uninsulated building during the winter, the moisture in the building air will then condense. As prior art laying houses are typically uninsulated, it is not uncommon for "rain" to form within these prior art laying houses. Condensation can adversely impact the health of the poultry. In particular, a high humidity environment can result in a heightened mortality of the poultry and can also result in an increase in various respiratory complications with the poultry. Furthermore, increased humidity tends to cause mechanical malfunctions and can reduce the useful life of the mechanical equipment through corrosion (e.g. rust).

High humidity also makes waste control more difficult. Many buildings have scraper systems. This scraper system extends across a manure catching surface to scrape the manure from the area in which it is excreted to the downstream end where it is collected. As the manure gets more humid, it gets more difficult for the scraper systems to efficiently remove the excrement. Another effect is the importance for the manure to dry and create a solid outer shell. This shell solidification reduces the amount of ammonia that is released into the environment.

In light of the shortcomings in the prior art, further technological developments are desirable in this area. Room for improvement exists in prior art laying houses with regard to decreasing the temperature variation between the upstream end and downstream end of the laying house, decreasing the ammonia and carbon dioxide present in the laying house during the winter months without excessive introduction of cold ambient air, and decreasing the humidity present within the laying house.

SUMMARY

One embodiment of the present application includes an apparatus for environmental control of agricultural animal housing facilities. Other embodiments include unique apparatuses, systems, and methods for providing environmental control of agricultural animal housing facilities. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
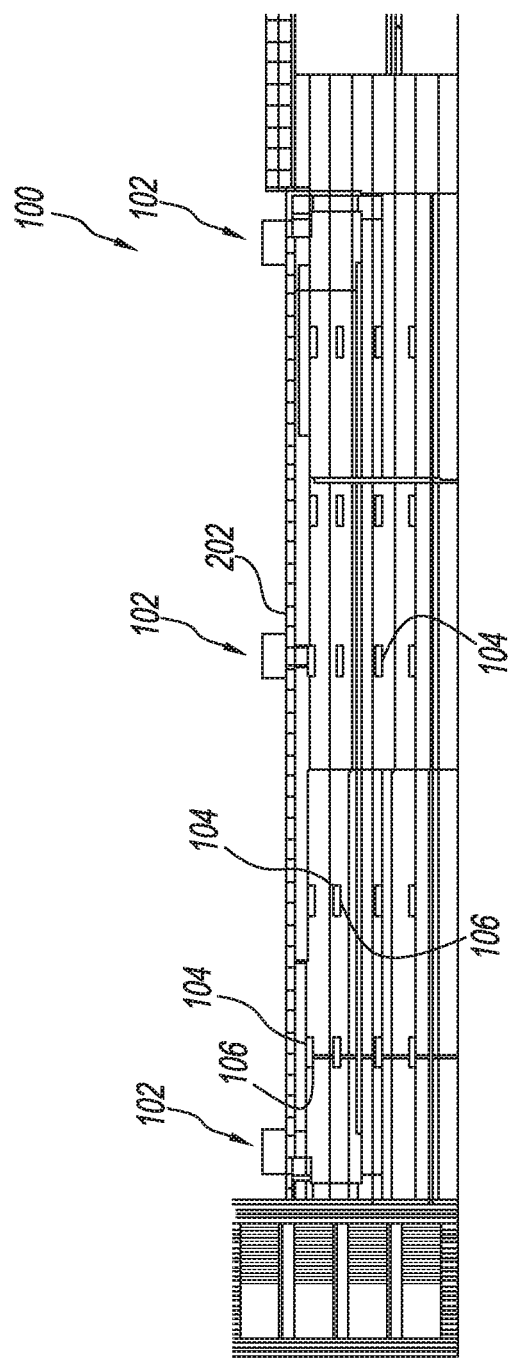
FIG. 1 is a schematic illustration of a side view of a building embodying one form of the environmental control system of the present application.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

In accordance with the present invention, an environmental control is provided for an agricultural animal housing facility. Although the present invention is described with regard to poultry, the environmental control system of the present invention is equally applicable to other types of livestock buildings such as may be utilized for hogs or cattle.

The system includes a plurality of air handling systems that are capable of drawing in fresh outdoor air as well as interior air into the air handling system, mixing the air within the air handling system, introducing the mixed or "preconditioned" air into the building and relieving the building air displaced by the amount of fresh air being provided. The environmental control system of the present application is a positive pressure air displacement system. These air handling systems are disposed at a plurality of locations, wherein each air handling system defines a specific "zone" within the building. The environmental control system of the present application enables the user to create desired temperature ranges within particular zones within the building to help optimize poultry feed intake and egg production. Zone control allows owners to not only change the amount of air but also the temperature of the air being introduced to each zone. The environmental control system of the present application also can reduce the "wind tunnel" like effects of the prior art airflow systems thereby decreasing excessive feather growth. Space temperatures tend to only vary plus-or-minus approx. 2-3 degrees F. throughout the house.

Poultry houses which include an embodiment of the present application can include a slatted floor on which the birds reside as is taught in the prior art. Under the slatted floor is a waste collection system which may comprise a series of belts or a series of scrapers. It is not unusual to have multi-story poultry buildings. As such, above the first floor there may be a second floor. Each of the first floor and the second floor may comprise an upper actual floor and a lower excrement floor. The upper actual floor is a slider floor on which the cages or nesting boxes are placed and where the poultry can reside. The lower floor is the excrement collection floor on which the manure is collected. This collection floor can employ a plurality of scrapers and/or belts to move the waste from the place at which the waste is deposited by the bird to a collection point, which may be at the end or side of the building, or somewhere exterior relative the building.

The multipoint distribution system of the present application lends itself quite well to multi-story poultry buildings. It is believed that multi-story poultry buildings may be constructed with increasing frequency in the future due to licensing, zoning restrictions, and costs of acquiring additional property.

Figure 2:
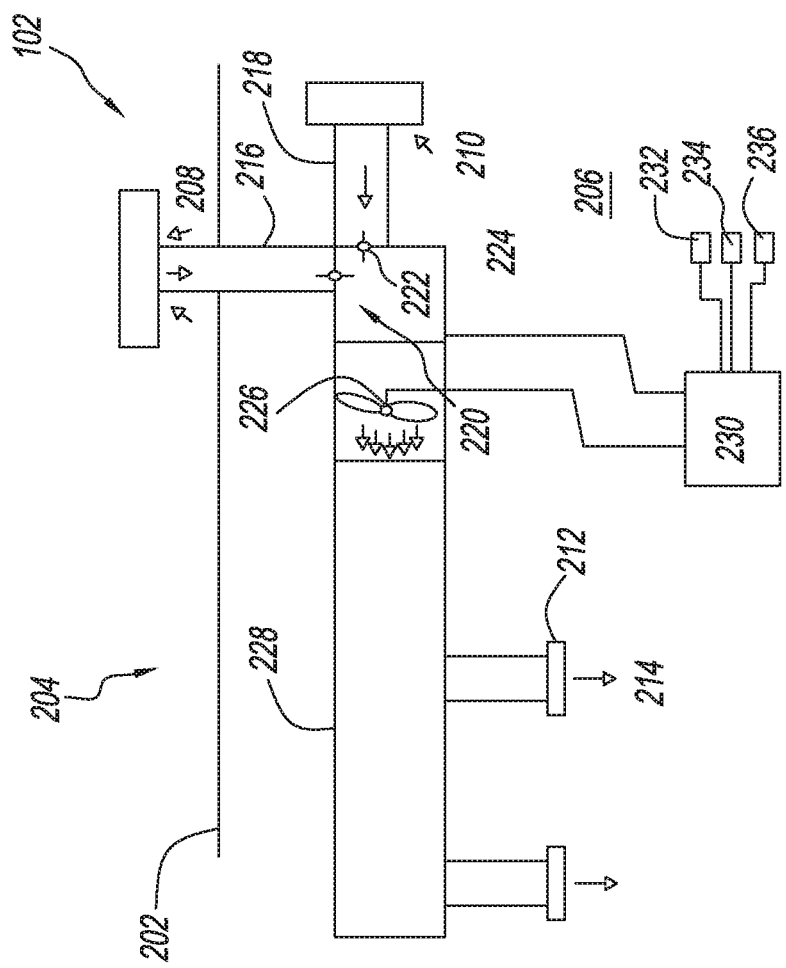
FIG. 2 is a cut away view of the environmental control system of the present application.

FIGS. 1 and 2 depict an agricultural animal housing facility 100, illustrated depicted as a pole building, which includes an environmental control system as taught by the present application. The length and relative dimensions of the building can generally be similar to those of the prior art. However, because of the multi-point distribution system of the present invention, the present invention is not as limited by building shape as the prior art. A plurality of air handling units 102 can be seen near the roof 202 of the building 200.

FIG. 2 depicts an air handling unit 102. The air handling unit 102 includes a first intake port 216 through which outside air 208 is drawn, and a second intake port 218 through which interior air 210 is drawn. The interior air 210 and outside air 208 are mixed within the air mixing unit 224 to be redistributed within an interior 206 the building 100. The ratio, or proportion, of outside air 208 to inside air 210 is controlled through a ducted plenum system 224 that controls the temperature of the mixed air 214 volume being supplied to the conditioned space. The mixed air 214 temperature can be changed (when outdoor conditions allow) depending upon the noxiousness of the inside air 210 (e.g. the concentration of ammonia, carbon dioxide, or the like) and also according to temperature. For example, on very cold days, a smaller volume of outside air 208 may be introduced, whereas on very warm days, a large volume of outside air 208 may be introduced.

The air handling unit 102 can include a centrifugal fan 226 and a mixing chamber 224 with two sets of motorized dampers 220, 222. Outside air 208 is ducted to one set of dampers 220 and house air 210 is ducted to the other 222. The dampers 220, 222 are modulated to control a mixed air 214 supply temperature that must be slightly higher than the house dew point temperature to control condensation. For example, on a hot day, the house air damper may be completely closed such that all of the air being discharged into the building 102 was drawn in thru the outdoor air damper 220. However, on a cold day, the dampers 220, 222 can allow a higher level of recirculation such that the internal temperature of the building 102 does not drop beyond a predetermined value. As can be readily appreciated, depending upon the design of the mixing chamber 224, the relative volume of air drawn in between the first 216 and second intake ports 218 is almost infinitely variable. The fan 226 draws air from the mixing plenum 224 and discharges the air into a duct system 228; thereby, introducing pretreated air into the zone.

The duct system 228 can include a plurality of ducts which comprise an air distribution system. A typical ducted air distribution system includes a plurality of runs or fingers that extend to various points within a specific "zone" of the building. As will be readily apparent, the use of a plurality of properly sized ducts permits controlling the temperature within a given zone.

Referring to FIGS. 1 and 2, each zone further comprises a plurality of gravity exhaust outlets 104. As will be readily understood to one of ordinary skill, the ducts 228 and duct outlets 212 should be sized for even air distribution within a specific zone. As various amounts of outdoor air 208 is pushed into a specific zone by the fan 226 within the air handler 102, a positive pressure builds within the zone. This pressure is released through a plurality of exhaust outlets 104 which release interior air 210 to the outdoors 204, thereby removing moisture, heat and noxious gasses from the building 100. Although a variety of positions are contemplated, FIG. 1 illustrates these exhaust outlets 104 as being disposed in exterior walls of the building 100 at set intervals.

The air handler 102 of the present application supplies air to a ducted air supply feeding network 228. In designing this air handling system and ductwork, it is desirable to maintain a constant positive space pressure over the zone. Depending upon how one operates the air handling system 102, one can vary the temperature and pressure in that particular zone. As was discussed above, one objective of the present application is to have the ability to maintain the temperature and air quality constant at all positions within the building 100. However, one might wish to have a lower temperature with younger birds to increase weight and a higher temperature with older birds to maintain lean birds and increase egg production.

Another benefit to a positive pressure system is that the owner can control where air is relieved from the space. This controllability over air relief allows for the reduction of air stagnation points within the house. This a benefit that was not available in the prior art and is of great benefit to overall egg production and bird health.

The ducted air distribution system of the present invention ensures that in all places within the zone, the temperature and air quality can be consistent. Additionally, the present system allows for a desirable temperature and air quality to be achieved within each zone. Each zone of the system can be independently adjusted relative the other zones such that a desired temperature and air quality parameters at that section. For example, birds will typically flock together in a given location within a cage free building. As will be readily understood in cage free environments, more heat and noxious gases can need to be removed from a zone where many birds are present than within a zone where few or no birds are present. The air handling system 102 of the present application permits the specific zone with increasing heat and/or increasing gases to draw more ambient air 208 inward to control the temperature and air quality within the zone. Relief dampers 106 can also be automatically opened/closed in this positive pressure environment to control where the heat and gaseous air goes.

It has been found by the applicants that modern poultry raising techniques provide special problems that were not typically encountered with former techniques. Formerly, birds were typically placed in cages. Through the placement of the cages, one can optimally distribute the birds over the volume of the building. However, modern techniques often employ cage-free raising. In cage-free raising the birds are confined within a building but have the ability to range about the floor or the portion of the floor of the building. It is not unusual that birds may tend to "hug together" in one area so that there is a greater density of birds in one area of the building than there may be in another area of the building. In this area where there is a larger density of birds, it will be appreciated that greater heat, carbon dioxide and ammonia will be produced.

In such a situation, the multi-point air handling system of the present application would enable the design of the air handler that is serving the zone in which the birds are dense to be turned up to a higher rate, to move the air more quickly, to maintain the air with higher quality and to exhaust the excess temperature that is caused by the highly dense birds. Conversely, in an area that has few birds present, the air handler can operate at a lower speed to deliver less air and reduce operational costs. Alternately, rather than delivering less air, the air handling system can be altered to change the relative volume of exterior/interior air to achieve the optimum conditions if fresh air is needed in the space.

Referring back to FIG. 2, with the distribution system of the present invention, the air quality and temperature within a given zone can be controlled. It is envisioned that one or more sensors 232, 234, 236 be operatively coupled to each of the air handling systems 102 so that the ambient conditions within a particular zone can be detected. A controller 230 can be employed to control the air handling system 102 of the present invention in response to the sensors 232, 234, 236 within the zones. The air handling system 102 of the present invention can vary the airflow and/or exterior/interior air mixture for a given zone in response to a sensor output from e.g. a temperature sensor 232, ammonia sensor 234, carbon dioxide sensor 236, or the like. For example, within a given zone a temperature sensor 232 may detect a high temperature. In response to this temperature increase, the air handling 102 system may increase the volume of fresh air relative recirculated air such that a desired temperature may be reached. Additionally and/or alternatively, in response to the temperature increase, the air handling system may increase an overall airflow within the zone such that an optimal temperature may be reached within the zone. The system also be logs/tracks these parameters in a historical database for future reference which provides owners more transparency on how the zones are behaving.

Although the present application is not limited to specific climate zones, the applicants have found that the present system can performs at its best when ambient average temperatures are less than 60 degrees. As will be readily apparent to one of ordinary skill, ambient air at 90 degrees cannot be utilized to cool an internal structure to 80 degrees absent chillers or the like. Therefore, it is anticipated that the supplemental air handling systems, such as those utilized in the prior art may be needed or desired in certain climate situations. Additionally, it is contemplated that one or more chillers, liquid to air heat exchangers, or evaporative coolers can be incorporated into the air handling system depending upon the climate the system will be utilized in. For example, an air handling system can comprise the use of an evaporative cooler in a dry area such as Arizona, wherein water is distributed over a media and air is blown past the media to pick up the water to thereby "cool the air" to wet bulb conditions. It will be appreciated that the primary parameters that can drive the decision can be based on the cost of the system and the cost of system operation.

An overall object of the present invention is to provide enhanced efficiency (e.g. increased egg output and controllable feed intake). Enhanced efficiencies are hopefully achieved in the present application by creating a greater layer of productivity by providing a better environment for the specific type of poultry, age of the poultry, etc. Additionally, productivity can be increased by reducing bird mortality, diseases as well as controlling other environmental conditions which adversely impact poultry.

Figure 3:
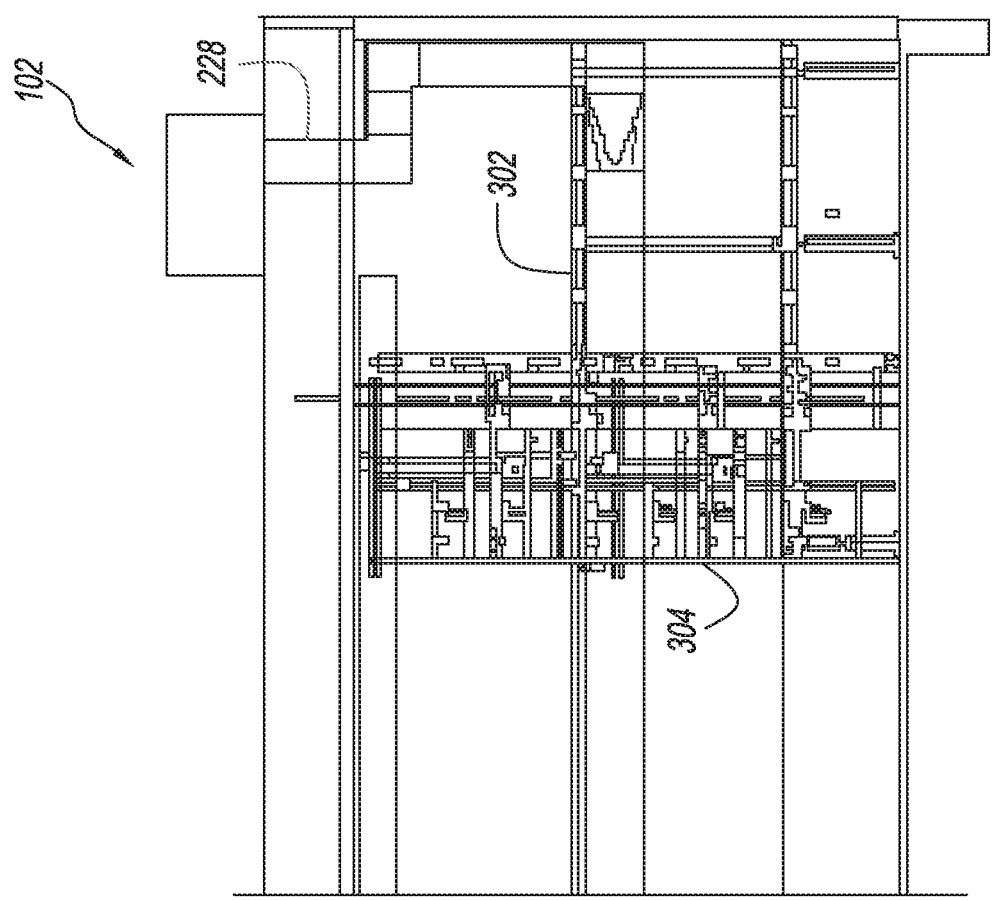
FIG. 3 is an enlarged view of the building of FIG. 1 which depicts a side view of cages and ducts.
Figure 4:
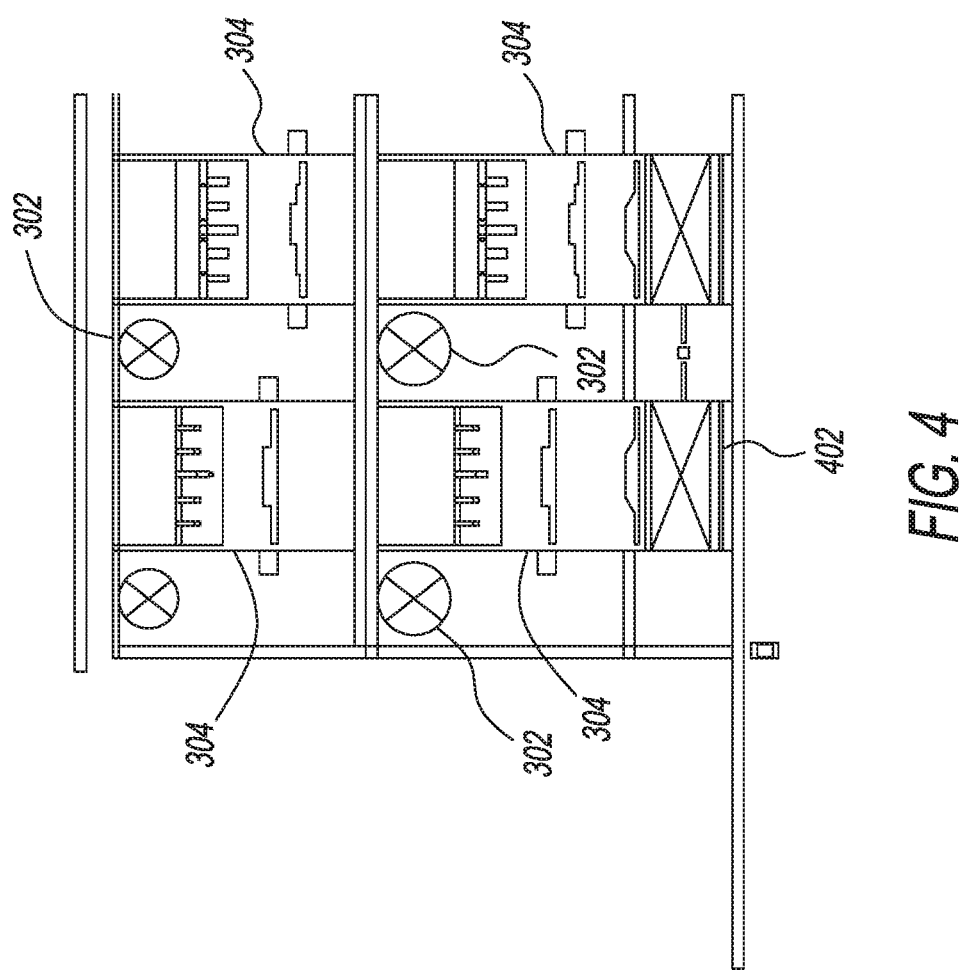
FIG. 4 is an end view of the building of FIG. 1 illustrating a layout for cages and ductwork.

FIGS. 1-4 depict the environmental control system of the present application in a newly construction building. FIG. 3 depicts a side view of the building 100 including the duct system 228, including ducts 302, of the present application. Cages 304 are also depicted to house the poultry. FIG. 4 depicts an end view of the building 100, depicting ducts 302 and return duct 402.

Figure 5:
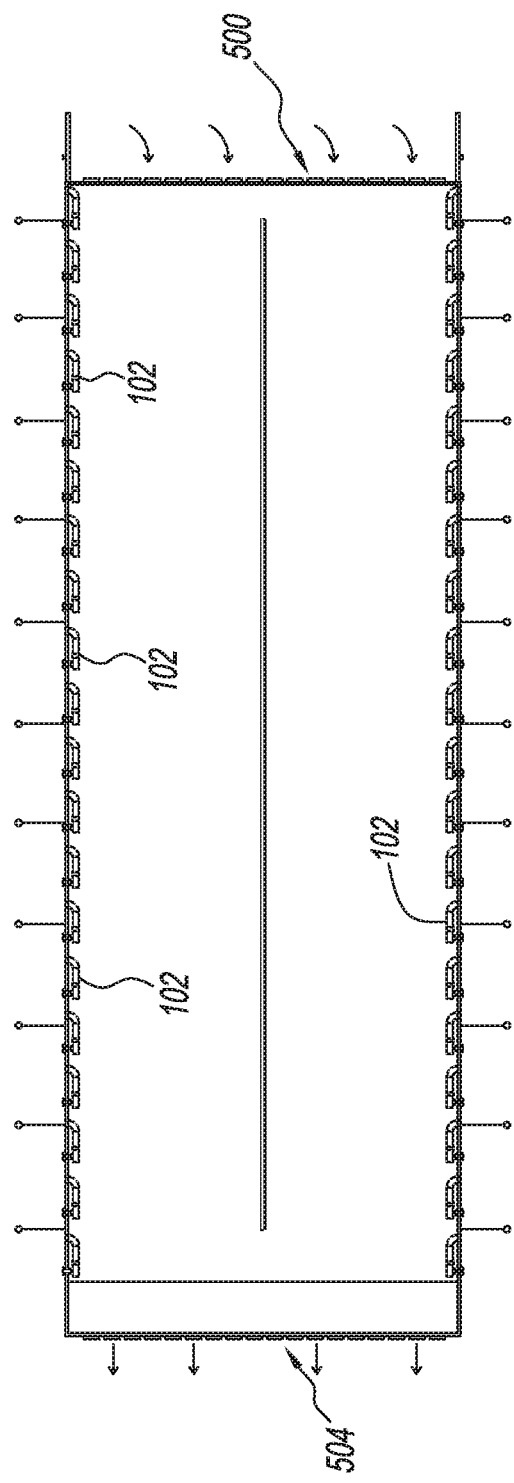
FIG. 5 is a schematic illustration of a top view of a first floor of a "tunnel ventilation" building retrofit to include the environmental control system of the present application.
Figure 6:
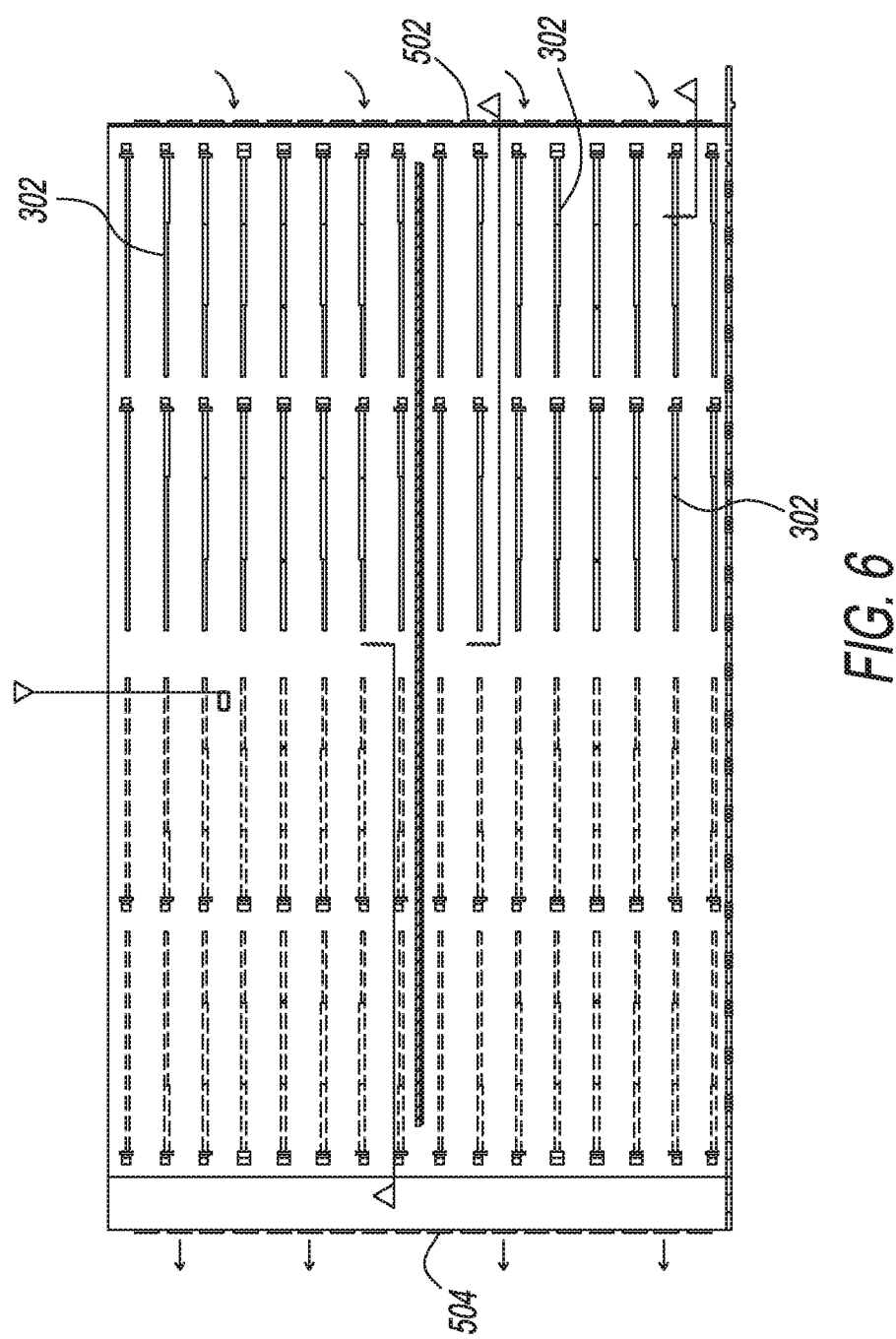
FIG. 6 is a schematic illustration of a top view of the second floor or the "tunnel ventilation" building retrofit of FIG. 5.
Figure 7:
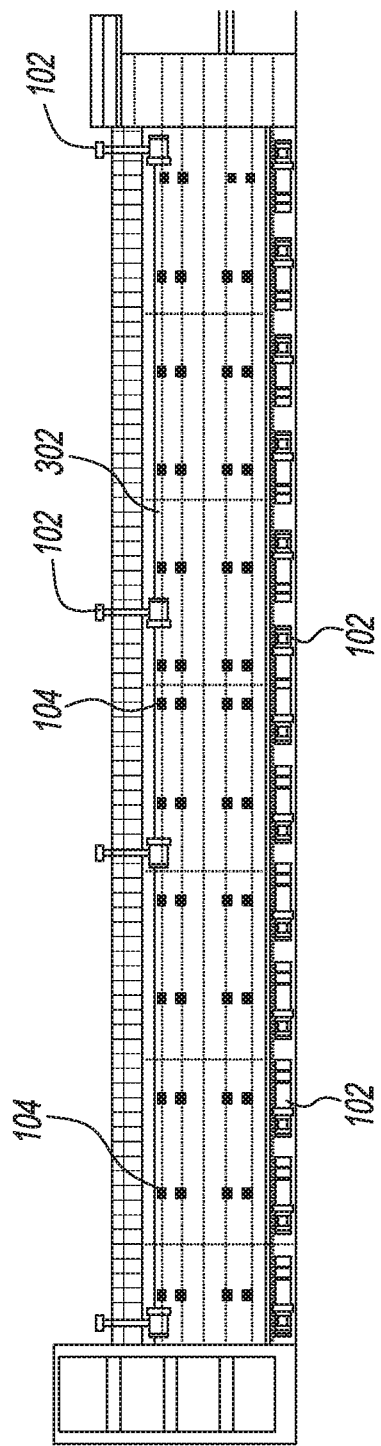
FIG. 7 is a schematic illustration of a side view of the "tunnel ventilation" building retrofit of FIG. 5.

The present application also has the ability to be retrofit into existing poultry laying houses. FIGS. 5-7 depict the environmental control system of the present application in a retrofit construction building which has a tunnel configuration (e.g. in which air flows from downstream dampers 502 to upstream dampers 504). When dealing with retrofit buildings one may be constrained in the manner in which one can run the duct work 302 in the system. The duct work 302 and routing systems, along with the number and type of air handlers 102 can vary from building to building depending upon the specific design parameters of the existing structures. For example, in some situations one may wish to route the duct 302 on the exterior of the building, such as on a roof or outside wall, if sufficient space is not present within the building. Generally, the retrofit building dimensions and space utilization may also affect the number and size of ducts that one can use. It is possible that retrofit buildings exist that do not enable ducts of a certain size to be used, thus requiring more ducts or alternative ducting locations to provide sufficient airflow.

As discussed above, the goal of the system is to provide a positive pressure environment. Although positive pressure is desired, there must be a venting system to vent out the positive pressure. The venting systems are provided via a plurality of roof vents or other relief locations at appropriate spots within the building.

Another feature that can be added to the building relates to air quality control. Proper treatment of the air could as in reduction of potential virus infections such as "Bird Flu". For example, various air treatment system options can include UV lights, Hepa filters, or the like can be incorporated into the air handling systems.

To achieve the best possible results for the present application, the building can include insulation. By properly insulating the building, temperature fluctuations within the building may be moderated (e.g. heat increase due to absorption of solar radiation on a summer day). This insulation can control the infiltration of outdoor air and building heat loss as well as building heat gain.

The building should include a digital control system. The control system can be coupled to the various sensors throughout the building. Among the sensors that one might run in the building are a temperature sensor, humidity sensor, ammonia sensor, carbon dioxide sensor, or the like. Additional sensors can be placed outside the building so that outside air temperature, pressure, ammonia, carbon dioxide and the like can also be monitored. The sensors are coupled to the digital controller which includes an output function.

The output function is designed to control the operation of the air handling system. The air handling system can respond to the output function in at least two ways. The first relates to whether the fan is on or off and what speed to which the fan operates. It controls the volume of tempered air that is fed into the interior of the building. The second control relates to the damper system that controls the relative volume of air between the outside air and the interior air to make sure that it is optimized.

Ideally, each zone should have at least one or more sensor systems, and will likely have one output system. Therefore, a plurality of digital controls can be used with each controlling individual air handling within the zone. Alternatively, more centralized control systems can be used that would control the operation of multiple zone and multiple air handlers, with each zone preferably being controlled independently of each other to provide the building operator for greater flexibility in adjusting the environmental conditions within a given zone to maximize those conditions.

In a preferred embodiment, the digital control has a communications ability, so that the operation of the controller, including the characteristics and the operation of the air handlers can be monitored remotely, such as on a phone or a remote computer terminal. There is preferably a mechanism to monitor bird mortality on an ongoing basis, and on trend basis.

Further, the control system may include a video feed that can be remotely translated to another remote location. This remote video can include surveillance, adjusting and monitoring a feed distribution and water, egg production monitoring, and well as bird mortality. This remote surveillance helps to provide the operator with information about the condition of the building, how it is being operated and how efficiently it is operating as well as the general health of the birds.

The controls can also be set up to perform various other functions. For example, the controls can perform an archiving function. The archiving function maintains records of historic data on an ongoing basis. This enables the operator to monitor the condition of the building, determine what parameters and what conditions within the specific building, or within individual zones therein, provide the maximum egg output such that the operator can maximize his production.

A second monitoring function relates to an alarm function. In using the alarm function, parameters can be set relating to temperature and other environmental conditions such as concentration of ammonia, humidity, carbon dioxide, or the like. If the alarm threshold is exceeded, an alarm might be raised so that the operator can take appropriate corrective action. For example, if the operator were to notice that the ammonia levels or carbon dioxide levels were increasing at a significant rate, it might alert the operator to try to look into the system, wherein he might learn that there is an equipment failure, or possibly clogged damper and cannot have the air flow characteristics desired. Additionally, an alarm function can trigger the system to close off recirculated air and only introduce fresh air to dissipate and/or dilute the carbon dioxide and ammonia as quickly and efficiently as possible. These parameters can all be configured and prioritized within the sequence of operations for the control system. This creates a proactive environment where the system's programming enables the system to respond to conditions and effectively reduce or eliminate poor environmental conditions within the house.

A poultry laying house of the present invention includes a plurality of air handling systems. Each air handling system selectively mixes ambient fresh air and recirculated air from the building. A plurality of supply ducts carry the volume of mixed air to a plurality of outlets. A fan internal to the air handling system provides the motive force to move the air. Each air handling system and associated ductwork defines a specific zone, and it is contemplated that each zone within the building can be controlled independent of the other zones. The air handling system creates a positive pressure within the zone. A plurality of exhaust (relief) vents are located within the building such that pressure is released from the building. The release of pressure allows for the removal of heat and noxious gasses. The plurality of zones of the present application provides for a significant increase in controllability within the poultry laying houses relative the prior art. Furthermore, an operator may designate warmer and cooler zones for birds of different ages.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An environmental control system for an agricultural animal housing facility, comprising:
   an air handling system in flow communication with an agricultural animal housing facility, wherein the air handling system is configured to receive intake air, apply a motive force to the intake air, and expel a volume of supply air into the agricultural animal housing facility;
   wherein the air handling system includes a first air intake configured to receive fresh air from a location external to the agricultural animal housing facility and a second air intake configured to receive internal air from a location interior to the agricultural animal housing facility;
   a damper disposed in the air handling system configured to selectively vary a proportion of fresh air to internal air introduced to the air handling system, wherein a temperature of supply air is at least partially controlled via the proportion of fresh air to internal air; and
   a duct in flow communication with an outlet of the air handling system, wherein the air handling system includes a fan located upstream of the duct and downstream of the first air intake and the second air intake, wherein a combined flow of fresh air from the first air intake and recirculated internal air from the second air intake flow through the duct to a plurality of supply air outlets located internal to the animal housing facility, and wherein the fresh air from the first air intake and the recirculated internal air from the second air intake is mixed prior to being expelled from the supply air outlets.

2. The environmental control system of claim 1, wherein the agricultural animal housing facility further includes a plurality air handling systems, and wherein each of the air handling systems can be controlled independent of the other air handling systems.

3. The environmental control system of claim 2, wherein the air handling system is configured to generate positive pressure inside the agricultural animal housing facility, wherein a plurality of exhaust air outlets are configured to vent a portion of internal air outside the agricultural animal housing facility.

4. The environmental control system of claim 1, further comprising a temperature sensor located within the agricultural animal housing facility, wherein the air handling system is configured to control at least one of a volume of supply air and the proportion of fresh air to internal air in response to a reading from the temperature sensor.

5. The environmental control system of claim 1, further comprising an ammonia sensor located within the agricultural animal housing facility, wherein the proportion of fresh air to internal air is determined in response to an ammonia concentration present within the agricultural animal housing facility.

6. The environmental control system of claim 5, wherein in response to the ammonia concentration exceeding an emergency threshold value the air handling system is configured to provide only fresh air.

7. The environmental control system of claim 2, further comprising a digital controller configured to control the air handling systems, wherein the digital controller is configured to control at least one of a volume of supply air and the proportion of fresh air to internal air in response to inputs from a temperature sensor, an ammonia sensor, and a carbon dioxide sensor.

8. The environmental control system of claim 1, wherein the air handling system further comprises a filter for the internal air.

9. A method for controlling the environment of an agricultural animal housing facility, comprising:
   providing an agricultural animal housing facility having a plurality of air handling systems disposed therein, wherein each air handling system includes a first air intake configured to receive fresh air from a location external to the agricultural animal housing facility and a second air intake configured to receive internal air from a location interior to the agricultural animal housing facility, wherein each air handling system includes a fan located downstream of the first air intake and the second air intake, wherein the fan is located upstream of a plurality of supply outlets which are located internal to the agricultural animal housing facility, and wherein the air handling system is configured to mix a proportion of fresh air and internal air and provide the combined mixed air to the plurality of supply outlets as supply air;
   determining an internal air temperature; and
   in response to the temperature of the internal air exceeding a desired temperature, increasing the proportion of fresh air to internal air.

10. The method of claim 9, further comprising determining a dew point of the internal air, and wherein at least one of the proportion of fresh air to internal air and a supply air flow volume are controlled such that the internal air temperature is maintained above the dew point.

11. The method of claim 10, further comprising determining an internal ammonia concentration, wherein in response to the internal ammonia concentration exceeding an ammonia threshold level the proportion of fresh air to internal air is increased and the supply air flow volume is increased.

12. The method of claim 11, further comprising filtering the internal air.

13. The method of claim 10, further comprising generating a positive pressure within the agricultural animal housing facility and venting a portion of internal air outside the agricultural animal housing facility.

14. An environmental control system for an agricultural animal housing facility, comprising:
   a plurality of air handling systems configured to deliver supply air to an agricultural animal housing facility, wherein each air handling system is configured to receive a portion of fresh air from a first air intake and a portion of recirculated internal air from a second air intake, wherein each air handling system is configured to mix the fresh air and internal air and provide the resultant mixture to a supply outlet to be discharged as supply air into the agricultural animal housing facility, wherein each air handling system includes a fan located downstream of the first air intake and the second air intake, and wherein the fan is located upstream of the supply outlet;

wherein the air handling system is configured to regulate a proportion of fresh air to internal air in response to an internal temperature of the agricultural animal housing facility.

15. The environmental control system of claim 14, further comprising a plurality of zones located within the agricultural animal housing facility, wherein each zone is defined by an air handling system, and wherein each zone can be controlled independent of the other zones.

16. The environmental control system of claim 14, wherein the air handling system is configured to control a proportion of fresh air to internal air in response to an ammonia concentration present within the agricultural animal housing facility.

17. The environmental control system of claim 16, further comprising a digital controller configured to control the air handling systems, wherein the digital controller is further configured to archive the internal temperature and the ammonia concentration.

18. The environmental control system of claim 17, wherein in response to an ammonia concentration exceeding an emergency ammonia threshold, the digital controller issues an alarm condition.

19. The environmental control system of claim 18, further comprising a plurality of exhaust vents configured to vent a portion of internal air outside the agricultural animal housing facility, and wherein the plurality of air handling systems are configured to generate a positive pressure inside the agricultural animal housing facility.

20. The environmental control system of claim 14, further comprising a filter configured to filter the supply air.

\* \* \* \* \*